March 6, 1945.　　P. GLASSER　　2,370,790
MEANS FOR PRESERVING TIRES
Filed Oct. 20, 1942

INVENTOR.
PHILIP GLASSER
BY Irving Seidman
ATTORNEY.

Patented Mar. 6, 1945

2,370,790

UNITED STATES PATENT OFFICE 2,370,790

MEANS FOR PRESERVING TIRES

Philip Glasser, New York, N. Y.

Application October 20, 1942, Serial No. 462,669

2 Claims. (Cl. 152—190)

This invention relates to means for preserving tires and tubes.

More particularly, it is an object of my invention to provide for an outer covering for automobile tires which can be readily attached to the rim of the wheel so that the wear will take place upon the covering instead of the rubber tire.

It is well known that when an automobile tire goes flat that before the automobile can stop a great deal of damage is done to the tube within the tire. With my outer covering, not only will the outer tire be preserved, but the tubes will also be preserved and safeguarded from damage since flat tires will be virtually eliminated. Since the tires and tubes will be preserved indefinitely by my invention, the carrying of spare tires and tubes will not be necessary.

A further object of my invention is to provide an outer covering that will virtually eliminate flat tires thereby saving a great deal of labor in the changing of tires when such tires go flat.

A further object of my invention is to provide a type of outer covering for automobile tires that will give greater frictional power in order to prevent skidding. Such outer covering will also aid in moving automobiles through snow and over ice.

A further object of my invention is to provide outer covering units so that such units can be easily and inexpensively replaced when worn.

A further object of my invention is to provide outer covering units with means for simply attaching such units to the rim of the wheel.

Still a further object of my invention is to provide outer covering units of ample wearing quality so that thousands of miles can be added to the life of such outer units and preserve automobile tires virtually indefinitely, including the side walls of said tires.

For a fuller understanding of the nature and objects of my invention reference is had to the following detailed description in connection with the accompanying drawing, in which.

Figure 1:
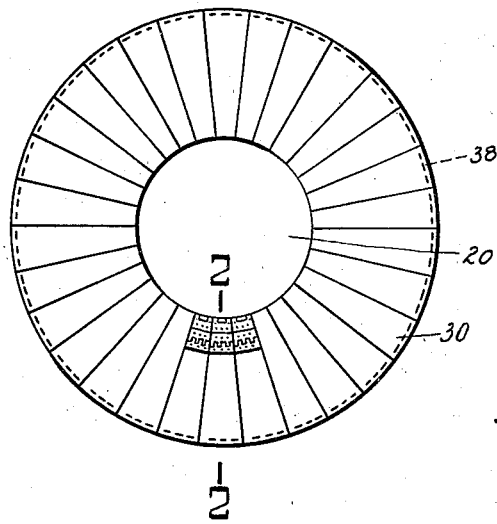
Fig. 1 is an elevational view of an automobile wheel showing the outer covering units in position upon the wheel.
Figure 2:
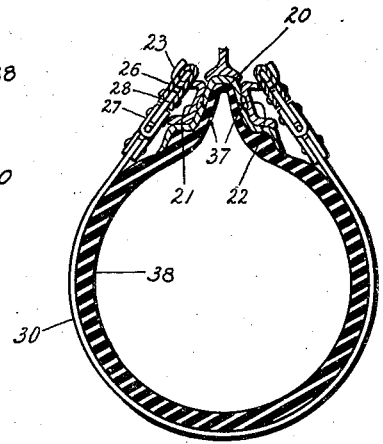
Fig. 2 is a section taken through line 2—2 of Fig. 1.
Figure 3:
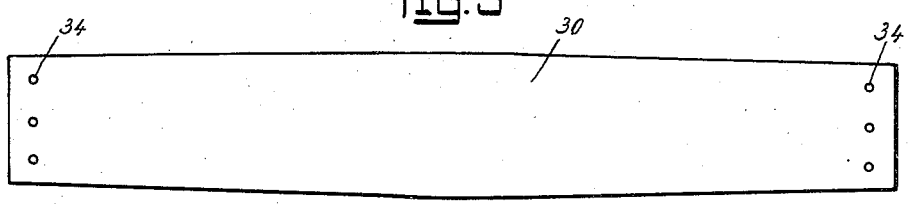
Fig. 3 is a plan view of the outer covering.
Figure 6:
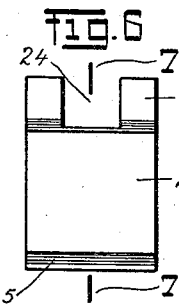
Fig. 6 is an elevational view of a holding flange member.
Figure 7:
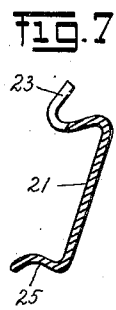
Fig. 7 is a section taken through line 7—7 of Fig. 6.

Refering to the drawing, numeral 20 represents a part of the rim of an automobile wheel to which is attached near the outer circumference a series of holding flange members 21 spaced very closely together.

Holding flange members 21 and 22 may be attached either by spot welding as shown at 37 or rivets. Another series of holding rim members 22 are attached in a similar manner around the inner portion of flange member 20, near the circumference so that holding flange members 21 and 22 are opposite each other. The holding flange member 21 is comprised of a bent inner portion 23 in the nature of a hook and has a cutout 24 in the central portion. The outer portion 25 of holding flange member 21 is bent outwardly to fit the contour of the rim of the wheel. Of course, it is entirely possible to provide a complete flange ring of one piece having a bent portion like portion 23.

Figure 4:
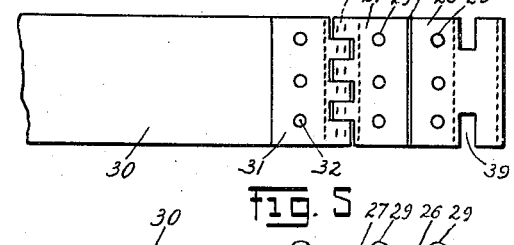
Fig. 4 is a plan view of the attaching members.
Figure 5:
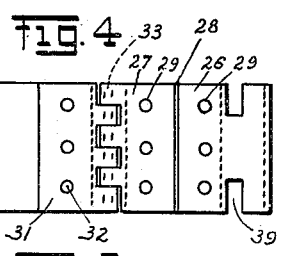
Fig. 5 is a side view of the attaching members as shown in Fig. 4.

Fig. 4 represents an attaching member comprised of a gripping portion 26, an attaching portion 27 and a rubber member 28. Gripping portion 26 and attaching portion 27 are U shaped, as shown in Fig. 5 and are attached to rubber member 28 closely together by rivets 29. Gripping portion 26 has opposed cutouts 39 for attachment to the holding flange members 21 and 22.

Outer covering 30 has attached at each end an attaching member 31 by rivets 32. This outer covering 30 may be made of an exceptionally good fabric material having durable wearing qualities, such as asbestos brake lining, leather, rubber or other suitable material. Holes 34 are provided to permit passage of rivets 32. The long sides are curved so that the edges will closely fit one another when placed over the tire, as shown in Fig. 1. In many instances it would be desirable to have such outer covering of a rough surfaced material to provide frictional qualities. Such covering would prevent skidding and provide better frictional surface when used on snow, ice or in the rain. Furthermore, the slight spaces between the coverings 30 provide additional gripping power and also provide suction means for better road surface contact.

Figure 8:
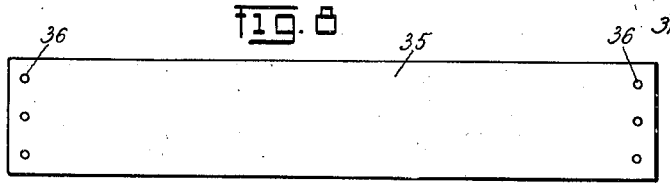
Fig. 8 is a plan view of a modified outer covering unit.

Fig. 8 shows an outer covering 35 having parallel long edges. Such outer covering members may be cut from a long tape or roll of material. Holes 36 are provided at each end for passage of rivets to attach the outer covering to the attaching member 31.

The attaching members 31 of the outer covering 30 are attached to attaching portion 27 by placing a pin 33 through the loops provided by such members.

In order to place the outer covering over the tire of an automobile wheel, the tire is first deflated and the two gripping portions 26 are attached to the holding flange members 31 and 22 by attaching cutouts 39 and bent portion 23 so that the outer covering 30 passes around the tire 38. The tire is then inflated so that the outer coverings 30 become taut over the tire 38. It will thus be seen that if a complete series of outer coverings 30 are placed around the tire in the manner just described, that the entire automobile tire circumference will be covered by the outer coverings 30.

In the event the tire runs over any irregularities in the surface of the road, sufficient play is permitted by rubber members 28 so that outer coverings 30 always remains taut over the tire.

In order to replace any worn outer covering members 30, the tire is first deflated, the worn outer covering 30 removed, pins 33 are taken out, new outer covering members 30 are again attached to the unit, as shown in Fig. 5, by replacing the pins 33, the entire unit is then again attached to holding flange members 21 and 22, and the tire is then inflated so that the outer coverings 30 again tautly cover the tire.

It is obvious that various changes and modifications may be made in the details of construction without departing from the general spirit of the invention as set forth in the appended claims.

I claim:

1. In combination, a wheel having a wheel rim with opposed holding flange members attached to said wheel rim on each side thereof with outer covering members having attaching and gripping members at each end of said outer covering members, elastic members secured between said attaching and gripping members, said flange members having equally spaced U-shaped cutout portions adapted to cooperate with said gripping members to resiliently and detachably secure said outer covering members around a tire upon said wheel.

2. In combination, a wheel having a wheel rim with opposed holding flange members attached to said wheel rim on each side thereof with outer covering members having attaching and gripping members at each end of said outer covering members, said outer covering being detachably secured to said gripping member, elastic members secured between said attaching and gripping members, said flange members having equally spaced V-shaped cutout portions adapted to cooperate with said gripping members to resiliently and detachably secure said outer covering members around a tire upon said wheel.

PHILIP GLASSER.